(12) United States Patent
Rosseel et al.

(10) Patent No.: US 6,575,190 B1
(45) Date of Patent: Jun. 10, 2003

(54) NON-RETURN VALVE FOR FUEL TANK

(75) Inventors: Alexis Rosseel, Compiegne (FR); Patrice Baudoux, Flavy le Martel (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/445,634
(22) PCT Filed: Apr. 12, 1999
(86) PCT No.: PCT/FR99/00846
§ 371 (c)(1), (2), (4) Date: May 3, 2000
(87) PCT Pub. No.: WO99/52731
PCT Pub. Date: Oct. 21, 1999

(30) Foreign Application Priority Data

Apr. 10, 1998 (FR) .................................... 98 04553

(51) Int. Cl.[7] .............................................. F16K 15/14
(52) U.S. Cl. .................. 137/512.15; 137/854; 137/856; 137/592; 251/75
(58) Field of Search ................. 137/529, 535, 137/538, 540, 592, 852, 859, 843, 854, 856, 512.15; 251/75

(56) References Cited

U.S. PATENT DOCUMENTS

| | | | | | |
|---|---|---|---|---|---|
| 1,886,205 | A | * | 11/1932 | Lyford | 137/543.17 |
| 2,579,855 | A | * | 12/1951 | Pockel et al. | 137/854 |
| 2,800,920 | A | * | 7/1957 | Smith | 137/856 |
| 3,059,637 | A | * | 10/1962 | Senne | 137/854 |
| 3,911,949 | A | * | 10/1975 | Hilden et al. | 137/592 |
| 4,188,676 | A | * | 2/1980 | Tolnai et al. | 251/75 |
| 4,414,973 | A | * | 11/1983 | Matheson et al. | 137/854 |
| 4,501,374 | A | | 2/1985 | Robertson | |
| 4,579,141 | A | * | 4/1986 | Arff | 137/223 |
| 4,715,393 | A | * | 12/1987 | Newton | 137/538 |
| 4,924,923 | A | | 5/1990 | Boehmer et al. | |
| 5,014,739 | A | * | 5/1991 | Csaszar | 137/512.15 |
| 5,325,979 | A | | 7/1994 | Watanabe | |
| 5,327,933 | A | * | 7/1994 | Ishikawa et al. | 137/527.6 |
| 5,518,026 | A | * | 5/1996 | Benjey | 137/852 |
| 5,526,843 | A | * | 6/1996 | Wolf et al. | 137/854 |
| 5,660,206 | A | * | 8/1997 | Neal et al. | 137/512.15 |
| 5,850,851 | A | * | 12/1998 | Miura et al. | 137/540 |
| 5,887,615 | A | * | 3/1999 | Goto et al. | 137/527.6 |
| 6,026,866 | A | * | 2/2000 | Nanaji | 141/59 |
| 6,283,147 | B1 | * | 9/2001 | Rosseel | 137/512.15 |

FOREIGN PATENT DOCUMENTS

| | | |
|---|---|---|
| EP | 0 624 128 | 9/1995 |
| EP | 0 751 024 | 1/1997 |

* cited by examiner

Primary Examiner—Michael Powell Buiz
Assistant Examiner—Ramesh Krishnamurthy
(74) Attorney, Agent, or Firm—Schweitzer Cornman Gross & Bondell LLP

(57) ABSTRACT

A non-return valve for a fuel tank, the valve comprising a substantially tubular body and a deformable shutter member fixed to said body, said shutter member being formed integrally by molding a plastics material and being shaped in such a manner as to return under its own elasticity into a shut position, with the valve body serving as a seat, whenever the shutter member is at rest and the pressure of fuel is no longer sufficient to overcome the elastic return action of the shutter member.

24 Claims, 4 Drawing Sheets

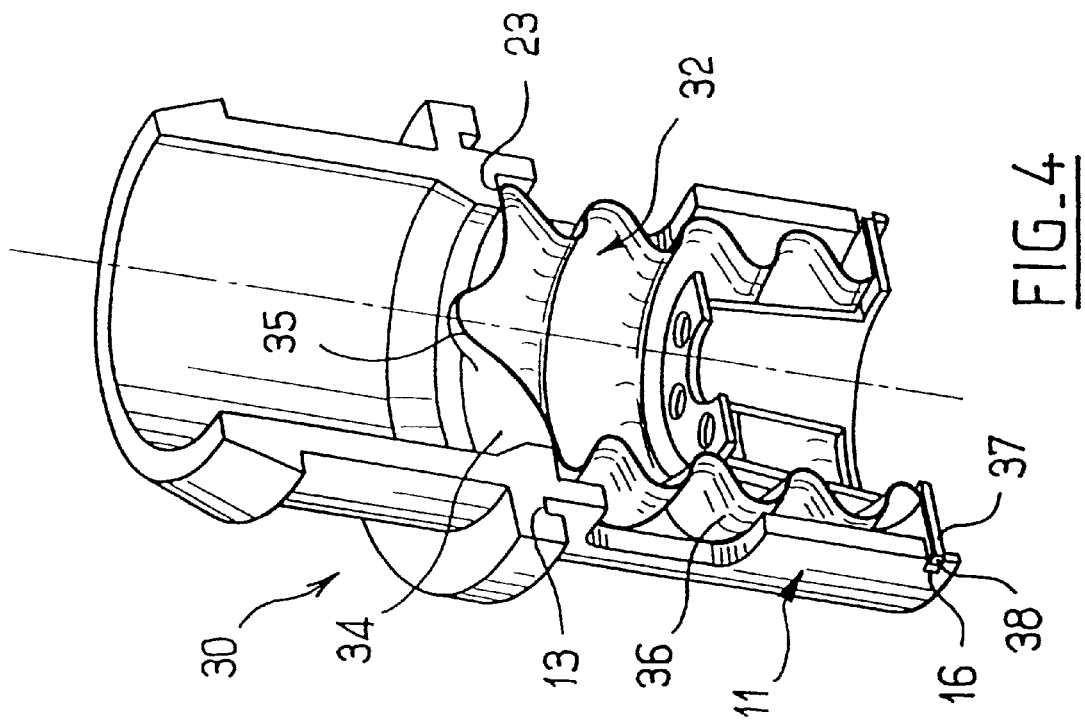
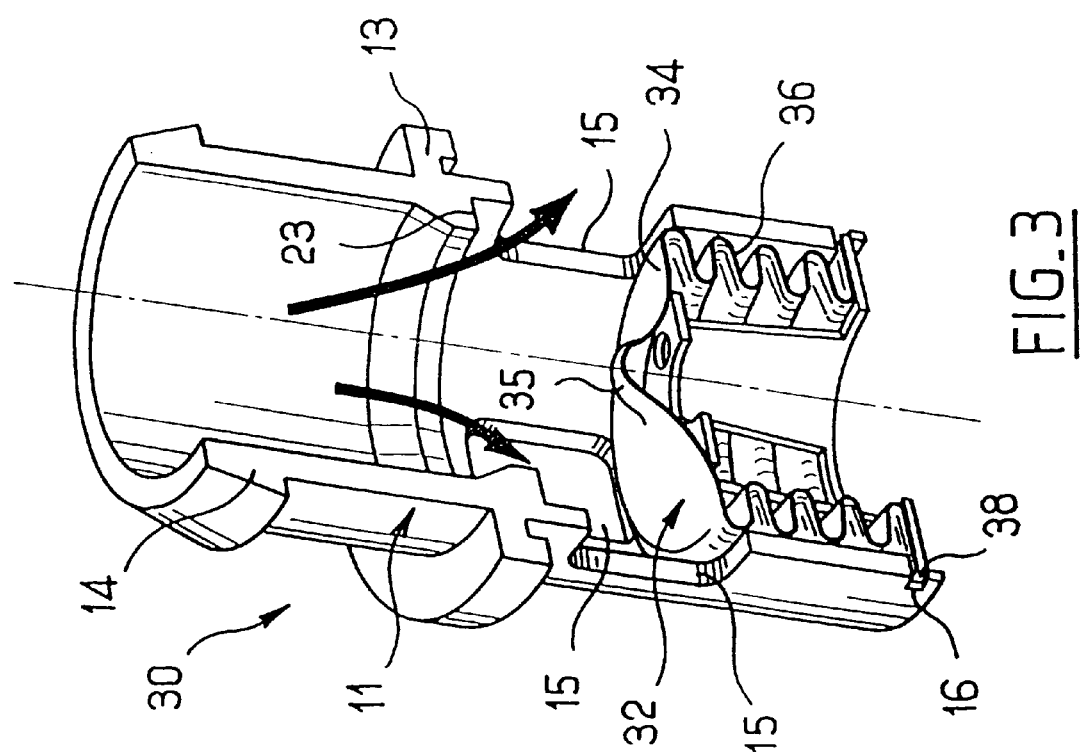

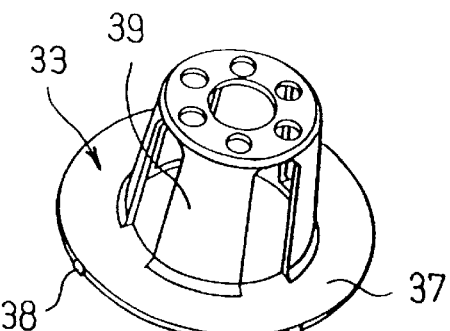
FIG_5
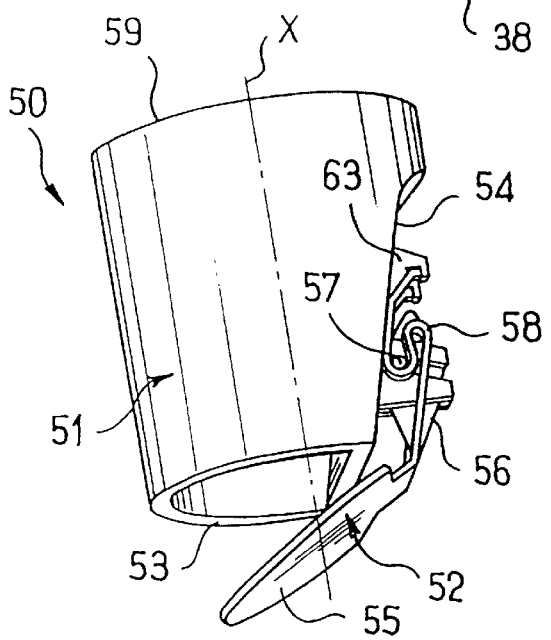
FIG_6
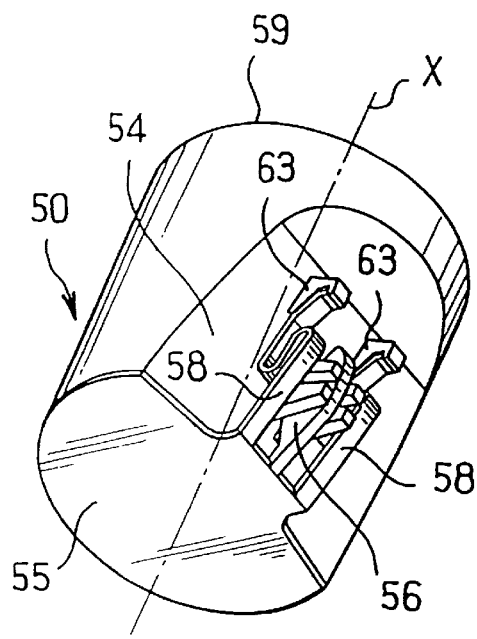
FIG_8
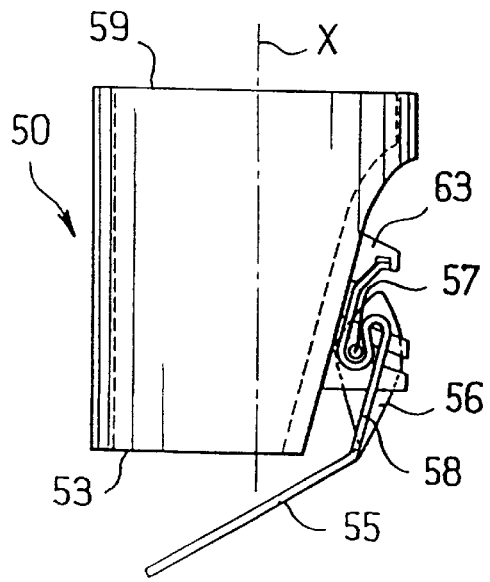
FIG_7
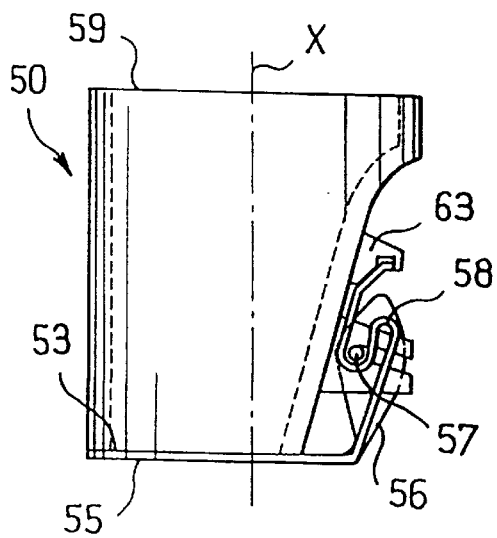
FIG_9

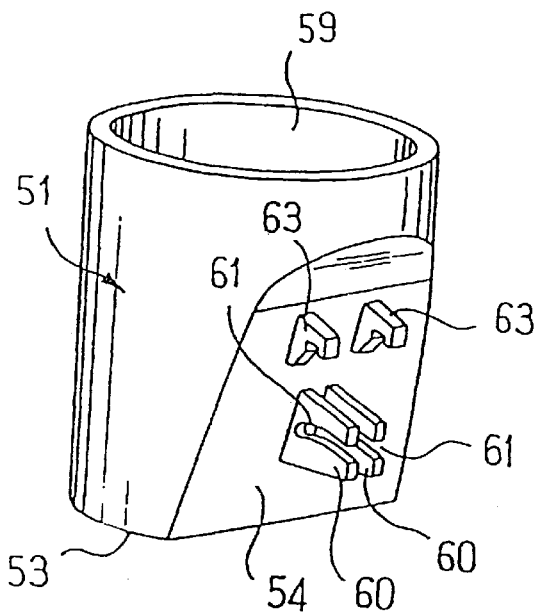
FIG_10
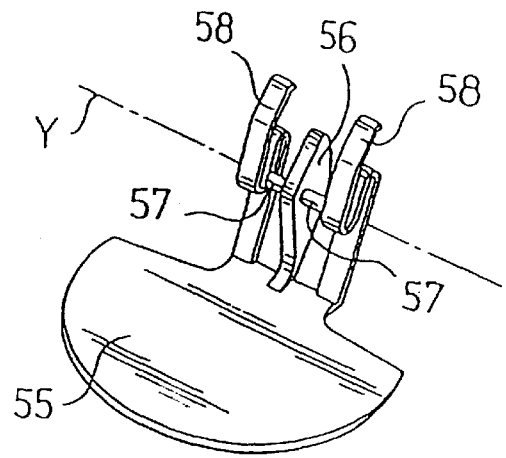
FIG_11
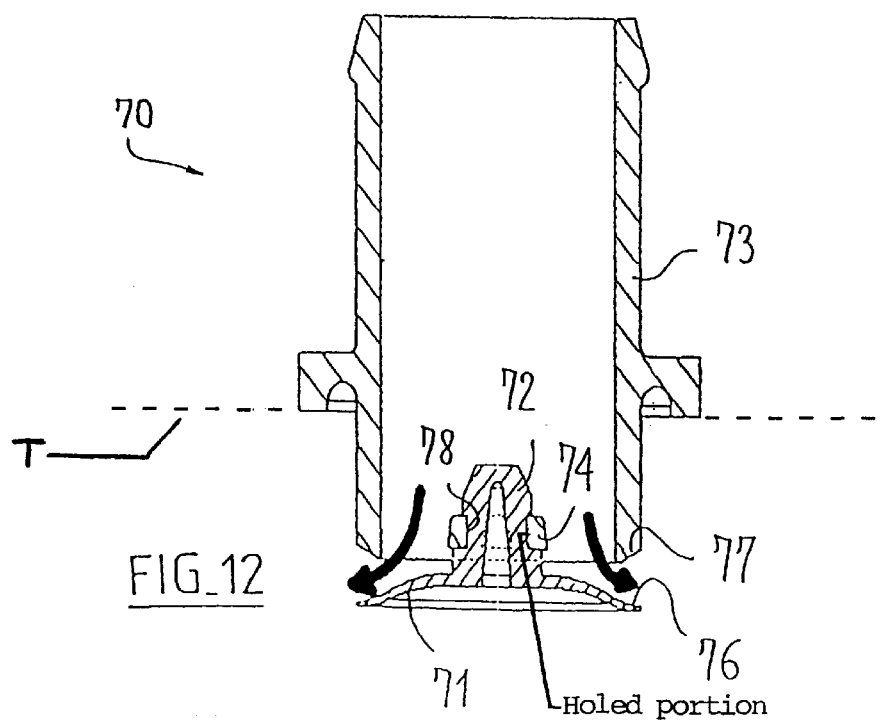
FIG_12

NON-RETURN VALVE FOR FUEL TANK

The present invention relates to a non-return valve for a fuel tank.

BACKGROUND OF THE INVENTION

Such a valve is mounted in the tube used for filling the tank, firstly to prevent the fuel present in the tank from being expelled in the event of the pressure inside the tank being raised, and secondly to reduce the risk of leakage in the event of an accident that causes the filler tube to be broken.

OBJECTS AND SUMMARY OF THE INVENTION

The present invention provides a novel non-return valve which is reliable and of relatively low cost to produce.

The non-return valve of the invention comprises a substantially tubular body and a deformable shutter member fixed to said body, said shutter member being formed integrally by molding a plastics material, that can possibly be an elastomer, and being shaped in such a manner as to return under its own elasticity into a shut position, with the valve body serving as a seat, whenever the shutter member is at rest and the pressure of fuel is no longer sufficient to overcome the elastic return action of the shutter member.

In a particular embodiment, the valve body is provided with at least one axial inlet orifice and with at least one lateral outlet orifice.

Still in a particular embodiment, the shutter member comprises a substantially rigid, shutter-forming portion that is movable inside the valve body, and at least one spring-forming, flexible strip for returning said substantially rigid portion into the shut position. Said flexible strip may extend substantially helically or in a zigzag.

In another particular embodiment, the shutter member comprises a substantially rigid, shutter-forming portion that is movable inside the valve body, and at least one spring-forming bellows for returning said substantially rigid portion into the shut position. Advantageously, said bellows is held in place by a retaining member comprising a base designed to be snap-fastened to the valve body and by a perforated thimble extending inside the bellows.

In another particular embodiment, the valve has a body that is substantially tubular, provided with an axial inlet orifice and with an axial outlet orifice, and the shutter member includes a flap organized at rest to shut the outlet orifice, said flap being secured to at least one flexible, spring-forming tab organized to return it into the shut position. The flap preferably has an extension hinged to the valve body.

In another particular embodiment, the shutter member has a flexible membrane which, at rest, has the shape of a spherical cap, the concave side thereof facing towards the filler tube, said flexible membrane being fixed to the valve body via a flexible central stud.

Preferably, at rest, the periphery of the membrane rests against one end of the valve body.

BRIEF DESCRIPTION OF THE DRAWINGS

The invention will be better understood on reading the following detailed description of four non-limiting embodiments of the invention and on examining the accompanying drawings, in which:

FIG. 3 is a diagrammatic perspective view of a valve constituting a second embodiment of the invention, with the valve body being cut away to show the structure of the shutter member in the open position;

FIG. 4 is a view analogous to FIG. 3, showing the valve at rest;

FIG. 5 is a perspective view of a component part of the valve shown in FIGS. 3 and 4;

FIG. 6 is a diagrammatic perspective view of a valve constituting a third embodiment of the invention, the shutter member being in its open position;

FIG. 7 is a diagrammatic side view of the valve shown in FIG. 6;

FIG. 8 is a diagrammatic perspective view of the valve shown in FIGS. 6 and 7, in its rest position;

FIG. 9 is a side view of the valve shown in FIG. 8;

FIGS. 10 and 11 are diagrammatic perspective views showing two component elements of the valve shown in FIGS. 6 to 9; and FIG. 12 is a diagrammatic axial section view of a valve constituting a fourth embodiment of the invention.

MORE DETAILED DESCRIPTION

Figure 1:
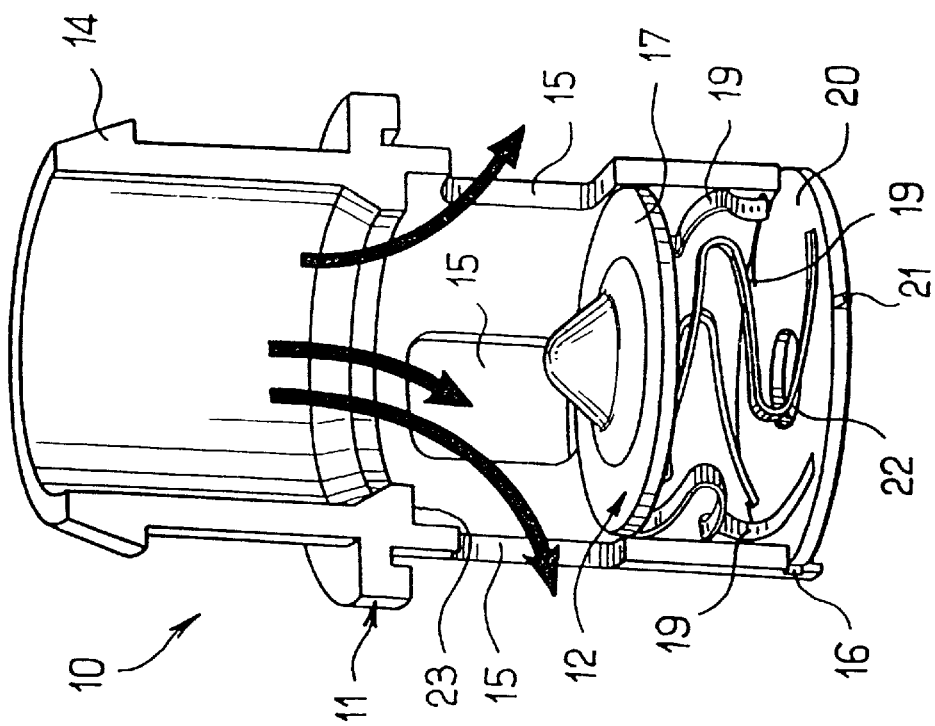
FIG. 1 is a diagrammatic perspective view of a valve constituting a first embodiment of the invention, with the valve body being cut away to show the structure of the shutter member at rest.
Figure 2:
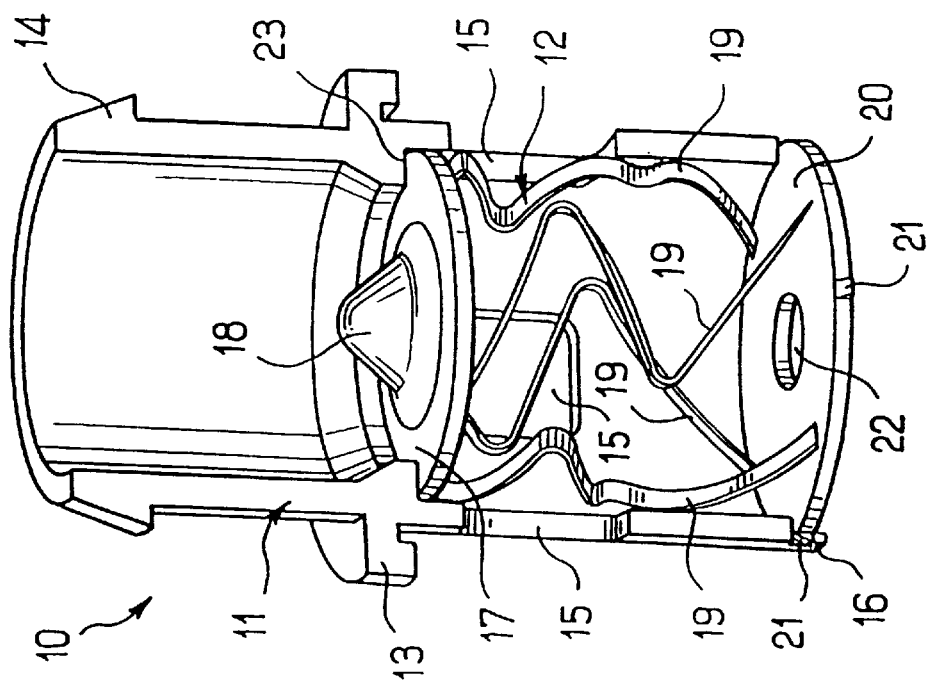
FIG. 2 is a view analogous to FIG. 1, showing the valve in its open position.

FIGS. 1 and 2 show a valve 10 constituting a first embodiment of the invention.

The valve 10 comprises a substantially tubular body 11 of rigid plastics material together with a shutter member 12.

The body 11 is provided with an outside collar 13 designed to enable the valve 10 to be fixed on the tank.

To one side of the collar 11, the top portion of the body 11 has an endpiece 14 designed for coupling to the tube which is used to fill the tank, which tube is known per se, and is not shown in the drawing.

On the other side of the collar 13, i.e. its bottom portion for insertion inside the tank, the body 11 is provided with lateral openings 15, and there are four of them in the example shown.

Recesses 16 are also provided close to the bottom edge of the valve body 11 for the purpose of fixing the shutter member 12, as described below.

The shutter member 12 comprises a substantially rigid portion constituting a shutter disk 17 which is provided in its center with a cone 18 that converges towards the endpiece 14.

A plurality of flexible strips 19 extend in substantially zigzag configuration beneath the shutter disk 17 to a fixing plate 20 provided with portions in relief 21 that are snap-fastened in the recesses 16.

In its center, the fixing plate 20 is provided with an orifice 22.

The shutter disk 17, the fixing plate 20, and the flexible strips 19 are formed integrally by molding a plastics material.

At rest, the flexible strips 19 urge the shutter disk 17 against an inside shoulder 23 of the body 11, acting as a seat, as can be seen in FIG. 1.

The valve 10 is then in its closed position and it opposes fuel rising from the tank through the lateral openings 15 or the orifice 22 towards the endpiece 14.

During filling, the effect of the pressure of fuel in the filling tube causes the shutter disk 17 to be pushed towards the fixing plate 20 inside the body 11 against the resilient return action of the flexible strips 19.

Fuel can then flow through the lateral openings 15, as shown by arrows in FIG. 2.

The cone 18 tends to deflect the flow of fuel towards the lateral openings 15.

As soon as the pressure of the fuel is no longer sufficient to overcome the return action of the flexible strips 19, the shutter disk 17 is returned by them to press against the shoulder 23 in the closed position shown in FIG. 1.

The orifice 22 is intended to avoid the shutter disk 17 being impeded in its movements due to any piston effect inside the body 11.

FIGS. 3 to 5 show a valve 30 constituting a second embodiment of the invention.

This valve 30 comprises a body 11 identical to the body of the valve 10 as described above, together with a shutter member 32 which is held in place inside the body 11 by a fixing member 33, which is shown on its own in FIG. 5.

The shutter member 32 comprises a substantially rigid portion forming a shutter disk 44 which is provided in its center with a cone 35 that converges towards the endpiece 14.

The fixing member 33 has a base 37 with portions in relief 38 that are snap-fastened in the recesses 16 of the body 11.

The shutter disk 34 is extended downwards by a bellows 36 whose bottom end bears against the base 37 of the fixing member 33.

The shutter disk 34 and the bellows 36 are formed integrally by molding an elastomer, e.g. a fluoro-silicone.

At rest, the bellows 36 maintains a deployed configuration by shape memory, thereby holding the shutter disk 34 in abutment against the shoulder 23 so as to close the valve.

Under the effect of the pressure of fuel inside the endpiece 14, the shutter disk 34 is pushed towards the base 37, thereby enabling the fuel to flow via the lateral openings 15, as shown in FIG. 3.

The fixing member 33 presents a perforated thimble 39 serving to guide the movements of the bellows 36 to some extent and guaranteeing that it deforms without turning inside-out, while keeping the axis of the shutter disk 34 in a direction that is substantially parallel to the axis of the body 11.

At the end of filling, the bellows 36 returns to its initial shape, thereby returning the shutter disk 34 against the shoulder 23 to close the valve.

FIGS. 6 to 11 show a valve 50 constituting a third embodiment of the invention.

The valve 50 comprises a valve body 51 of rigid plastics material, together with a shutter member 52.

The general shape of the body 51 is that of a right circular cylinder about an axis X, with the exception of a setback 54 housing a hinge mechanism for the shutter member 52 on the outside of the body, as described below.

The body 51 does not have lateral openings, but only axial openings, specifically an inlet orifice 59 facing upstream, i.e. towards the filler tube, and an outlet orifice 53, said outlet orifice 53 being situated at its tank end and being of smaller section that the inlet orifice 59 because of the presence of the setback 54.

The entire valve 50 can be mounted inside the filler tube.

The shutter member 52 comprises a flap 55 suitable, at rest, for bearing against the edge of the outlet orifice 53, as shown in FIGS. 8 and 9, thereby shutting On one side, the flap 55 has an extension 56 presenting two pins 57 extending along an axis Y, and also two flexible tabs 58 disposed on either side of the extension 56 and the pins 57.

Each flexible tab 58 is folded over twice as shown in the figures so as to form a return spring to return the flap 55 into its shut position.

In the setback 54, the valve 50 has two parallel lugs 60 each provided with a slot 61, and two hooks 63 whose concave sides face towards the lugs 60, the pins 57 being designed to be received in the bottoms of the slots 61 and the free ends of the flexible tabs 58 being designed to snap-fasten in the hooks 63, as shown in FIG. 9, in particular.

It will be observed that the shutter member 52 is easily mounted without requiring any special tooling.

The shape of the flexible tabs 58 is selected in such a manner as to cause them to tend to hold the flap 55 flat against the edge of the outlet orifice 53 so as to close the valve.

Under the effect of the pressure of fuel in the filler tube, the flap 55 is pushed back and the flexible tabs 58 are deformed elastically.

The flap 55 pivots about the axis Y which is perpendicular to the axis X, with the pins 57 turning in the bottoms of the slots 61.

When the pressure of fuel inside the body 51 is no longer sufficient to push back the flap 55, it closes under the return action of the flexible tabs 58.

Naturally, the invention is not limited to the embodiments described.

In particular, the shape of the valve body and the shape of the shutter member can be modified without going beyond the ambit of the invention.

Like the valve 70 shown in FIG. 12, it is possible, in particular, to make the shutter member in the form of a flexible membrane 71 whose rest shape constitutes a spherical cap with its concave side facing towards the filler tube, said flexible membrane being secured to the valve body 73 by means of a central fixing stud 72.

More particularly, as can be seen in FIG. 12, the stud 72 has an annular groove 78 snap-fastened in a ring 74 integrally formed with the remainder of the body 73 by molding plastics material. The stud 72 is hollow to make it easier to insert into the ring 74. Two bridges of material extend radially in diametrically opposite directions to connect the ring 74 to the remainder of the valve body 73.

The membrane 71 is shown in the open position that it takes up under the effect of the flow of fuel in the filler tube while the tank is being filled. At rest, its periphery 76 rests against the end 77 of the body 73.

The concave side of the membrane 71 flips over due to elastic deformation when it switches from its rest position to its open position.

The membrane 71 and the stud 72 are formed integrally out of an elastomer plastics material.

Finally, a valve of the invention makes it possible in reliable and economic manner:
  to prevent fuel being expelled back out through the filler tube in the event of the pressure inside the tank rising, while not impeding flow in the filling direction; and
  to provide a leakproof closure in the event of the tube breaking.

The valve of the invention is also of relatively small axial size.

What is claimed is:

1. A fuel tank comprising
a non-return valve comprising
a body having
a substantially tubular part and
a portion spaced from said tubular part,
an elastic deformable shutter member capable of taking a closed position and an open position, said deformable shutter having
a flexible portion having a region in contact with said tubular part in said closed position and spaced apart from said tubular part in said open position,
a stud made integrally with said flexible portion, said stud being fixed to said portion of the body spaced from said tubular part.

2. A fuel tank according to claim 1, wherein, in said closed position, the periphery of said flexible portion rests against one end of said tubular part.

3. A fuel tank according to claim 1, wherein said flexible portion and said stud are made of elastomer.

4. A fuel tank according to claim 1, wherein said body has an outside collar fixed on said fuel tank.

5. A fuel tank according to claim 1, wherein said stud is snapped on said body.

6. A fuel tank according to claim 1, wherein said stud has an annular groove.

7. A fuel tank according to claim 1, wherein said flexible portion is flat around an opening of an internal cavity of said stud.

8. A fuel tank according to claim 1, wherein said body has a holed portion for fixing said stud and wherein said stud extends through said holed portion.

9. A fuel tank according to claim 1, wherein said valve is made of two pieces only.

10. A fuel tank according to claim 1, wherein said body has a first portion extending outwardly of a wall of the fuel tank and a second portion extending inwardly of said wall.

11. A fuel tank according to claim 1, wherein said flexible portion has an overall concave face facing toward said body in said closed position.

12. A fuel tank comprising
a non-return valve comprising
a body having
a substantially tubular part and
a portion spaced from said tubular part,
an elastic deformable shutter member capable of taking a closed position and an open position, said deformable shutter having
a flexible portion having a region in contact with said tubular part in said closed position and spaced apart from said tubular part in said open position,
a hollow stud made integrally with said flexible portion, said stud being fixed to said portion of the body spaced from said tubular part.

13. A fuel tank according to claim 12, wherein, in said closed position, the periphery of said flexible portion rests against one end of said tubular part.

14. A fuel tank according to claim 12, wherein said flexible portion and said stud are made of elastomer.

15. A fuel tank according to claim 12, wherein said body has an outside collar fixed on said fuel tank.

16. A fuel tank according to claim 12, wherein said stud is snapped on said body.

17. A fuel tank according claim 12, wherein said stud has an annular groove.

18. A fuel tank according to claim 12, wherein said flexible portion is flat around an opening of an internal cavity of said stud.

19. A fuel tank according to claim 12, wherein said body has a holed portion for fixing said stud and wherein said stud extends through said holed portion.

20. A fuel tank according to claim 12, wherein said valve is made of two pieces only.

21. A fuel tank according to claim 12, wherein said body has a first portion extending outwardly of a wall of the fuel tank and a second portion extending inwardly of said wall.

22. A fuel tank according to claim 12, wherein said flexible portion has an overall concave face facing toward said body in said closed position.

23. A fuel tank according to claim 12, wherein said hollow stud has a cavity opening out at a first end on a concave face of said flexible portion and closed at a second end opposite the first end.

24. A fuel tank according to claim 23, wherein said cavity has cross-section that decreases from the first to the second end.

* * * * *